United States Patent [19]

Gartner et al.

[11] 3,917,246

[45] Nov. 4, 1975

[54] TUNABLE VIBRATION ABSORBER

[76] Inventors: Joseph R. Gartner, 147 Davis Road, Storrs, Conn. 06268; Harold M. Miller, 210 Fletcher St., Whittinsville, Mass. 01588

[22] Filed: Apr. 15, 1974

[21] Appl. No.: 461,265

[52] U.S. Cl. ............................ 267/136; 188/1 B
[51] Int. Cl.² .................................... F16F 9/02
[58] Field of Search ......... 188/1 B; 74/574; 267/136, 267/137

[56] References Cited
UNITED STATES PATENTS

| | | | |
|---|---|---|---|
| 3,807,678 | 4/1974 | Karnopp et al. | 188/1 B |
| 3,836,098 | 9/1974 | Miyashita | 188/1 B |

*Primary Examiner*—James B. Marbert
*Attorney, Agent, or Firm*—Stephen E. Revis

[57] ABSTRACT

A vibration absorber includes an inertia mass having oppositely directed spaced apart pistons, each being disposed within an independent pressurizable cylindrical chamber which is rigidly attached to a vibrating body. The inertia mass moves back and forth in response to vibrations of the vibrating body, alternately compressing the pressurizable fluid within each chamber. Automatic adjusting means in one embodiment keeps the inertia mass reciprocating substantially evenly about a central point whereby the restoring force on each piston face at the end of each stroke is always about the same. A pressure regulator keeps equal minimum pressures within the chambers. The magnitude of the pressure in conjunction with the mean volume of the pressurized chambers determines the natural period of the reciprocating motion. The pressure can be set so that the device may absorb a wide band of vibrating frequencies of the vibrating body.

7 Claims, 2 Drawing Figures

FIG_1

TUNABLE VIBRATION ABSORBER

BACKGROUND OF THE INVENTION

1. Field of the Invention

This invention relates to vibration absorbers.

2. Description of the Prior Art

Many types of devices for absorbing vibration are well known in the art. Some trace back their origin to the concepts disclosed in Frahm, Device for Damping Vibrations of Bodies, U.S. Pat. No. 989,958 dated Apr. 18, 1911. Frahm recognized that disturbing vibrations may be virtually eliminated by means of an auxiliary body arranged within or on the main body whose vibrations are to be damped. Frahm teaches that if the "auxiliary body is caused to vibrate by the vibrations of the main body and the natural vibrations of the auxiliary body have as nearly as possible the same period as those of the main body" then the "vibrations of the main body are annulled by the secondary resonance vibrations of the smaller body. The member joining the auxiliary to the main body exercises a reaction on the main body owing to the phase difference, which is directed against the primary disturbing impacts on the main body". Frahm's theories are not disputed, however, a serious drawback to all of the devices which he describes in his patent is that they are only able to absorb vibrations over a very narrow frequency band which is dependent upon the spring rate of the means acting against the motion of the auxiliary mass.

Everett U.S. Pat. No. 2,819,775 describes a vibration absorber which he claims can absorb vibrations over a wide range of frequencies of a vibrating body. The apparatus described includes a housing forming a closed cylindrical compartment having a cylindrical auxiliary mass disposed for a reciprocal motion therewithin. The end faces of the auxiliary mass in combination with the housing define a pair of spaced chambers at the ends of the compartment. Everett requires that there be a common connecting conduit between these chambers and that the chambers be pressurized through this common conduit. Everett also requires that there be some means within the common conduit that simultaneously offers high resistance to flow of pressurized fluid from the chambers into the conduit and provides a relatively low resistance to fluid flow from the conduit into the chambers. Everett teaches that the vibrating characteristics of the auxiliary mass can be modified by adjusting the pressure within the chambers. The pressure is chosen depending upon the frequency of the vibration of the vibrating main body. Thereby Everett claims to have the ability to absorb the frequency of vibration of his choice simply by choosing the proper pressure for the chambers of his device. He claims that a single device may be operable over a wide range of vibrational frequencies.

SUMMARY OF THE INVENTION

One object of the present invention is an improved device for absorbing vibrations.

Another object of the present invention is an improved device capable of being tuned or adjusted to absorb a wide range of frequencies of vibration.

Accordingly, a vibration absorber includes an auxiliary mass having axially aligned oppositely facing pistons at each end thereof, which are disposed in independent cylindrical chambers having equal minimum pressure therewithin which is adjustable; by setting the proper minimum pressures in the chambers the auxiliary mass will reciprocate at about the same natural period of vibration as the vibrations of the mass whose vibrations are to be absorbed, thereby effectively damping those vibrations; the absorber also includes means which automatically adjusts the position about which the auxiliary mass reciprocates to maintain approximately symmetric restoring forces on each of the pistons during reciprocating motion; preferably, this is done by intermittently or continuously adjusting the position of the inertia mass to prevent excessive disparity between the minimum volumes in the chambers during any one cycle.

The present invention differs from Everett in several very important respects. For example, the two piston chambers are independent of each other rather than being in communication with each other through a common passageway. The common connection between chambers in Everett results in a damping effect due to the escape of fluid from one chamber to the other during each compression stroke. This reduces the absorbing effectiveness of Everett's device; by this it is meant that for the same auxiliary mass the present invention will be more effective than the device shown in Everett. By dispensing with the common conduit the present invention also dispenses with the restriction nozzles of Everett, which Everett claims are supposed to simultaneously prevent fluid from flowing from one chamber to the other during operation, but which allow the chambers to equalize in pressure due to a controlled low volumetric flow rate which occurs from chamber to chamber through the nozzles and conduit.

A further distinction between Everett and the present invention, and one which raises serious doubts as to the performability of Everett, is the fact that Everett has no means for preventing the inertia mass from drifting until it bottoms out at one end of one of the chambers. Once the inertia mass begins banging against the end of the cylinder the effectiveness of the entire device is substantially reduced. Maintaining a minimum volume by the incorporation of flanges 29, 30 of Everett does not prevent bottoming out; and once either of the flanges hits the end of the cylinder the fluid therewithin can no longer act as a fluid spring as is required for proper operation of the vibration absorber.

Furthermore, merely preventing the inertia mass from bottoming out in one of the cylinders is not sufficient for maintaining optimum vibration absorbing effectiveness. As heretofore mentioned, in order to absorb a particular frequency of vibration the auxiliary mass must naturally vibrate or reciprocate with as nearly as possible the same period as the vibrations of the main body. The period of vibration of the auxiliary mass in both Everett and in the present invention is dependent upon the restoring force on each of the piston faces of the inertia mass. This restoring force is not dependent solely upon the pressures within the chambers, but is a linear function of the minimum pressure and a non-linear function of the difference between the two volumes of the two chambers. Therefore, maintaining equal pressures in the chambers as in Everett is insufficient to maintain equal restoring forces on each of the piston faces at the end of each stroke; and thus, as the inertia mass drifts either to the left or to the right, the restoring forces on the piston faces will become unequal and the period of vibration of the inertia mass will change. If the pressures in the chambers are initially set to provide maximum absorbing effectiveness when the inertia mass is centered such that the volumes of the chambers are substantially equal at the end of each compression stroke during oscillation of the inertia mass, then the absorbing effectiveness will decrease as the inertia mass drifts in either direction.

In addition to the lack of means to continuously re-position the inertia mass to maintain equal restoring forces on the piston faces, the inertia mass of Everett is more prone to drifting than the device of the subject invention due to the common connection between the chambers which permits fluid to flow therebetween. The present invention eliminates this undesirable feature by having independent chambers and includes means which not only prevents the vibrating inertia mass from bottoming out, but in one aspect of the present invention includes means for sensing when the inertia mass has drifted too far and for re-positioning the inertia mass to prevent excessive disparity between the minimum volumes (i.e. at the end of each compression stroke) within the chambers thereby assuring substantially balanced dynamic restoring forces (i.e. symmetric) on both piston faces during operation of the device.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
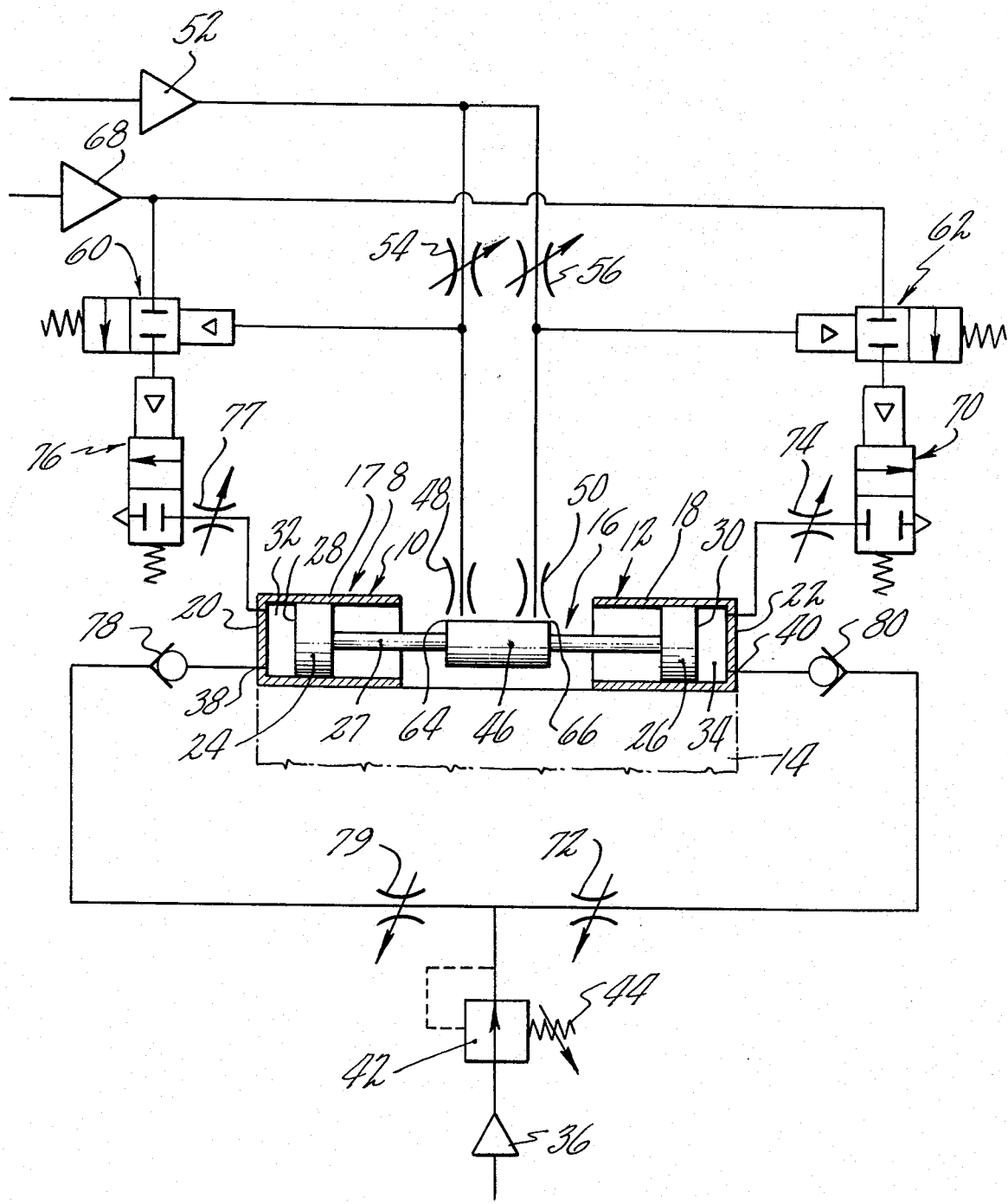
FIG. 1 is a schematic representation of one embodiment of the present invention.

An exemplary embodiment of the subject invention is shown schematically in FIG. 1 in which all the symbols conform to the current USASY 32.10 standard and the large open triangles indicate a source of pressurized air. The vibration absorber shown comprises housing means 8 including left and right cylinders 10, 12 respectively which are rigidly attached by means not shown to a mass 14 whose vibrations it is desired to absorb. The mass 14 may be, for example, a machine tool, an automobile, a stationary engine, or any device which is prone to vibrate. Each housing 10, 12 comprises a cylindrical sidewall 17, 18 and an end wall 20, 22. The cylinders 10, 12 also preferably have their axes aligned with one another. The absorber device also includes an inertia mass generally represented by the numeral 16, the mass including a pair of pistons 24, 26 rigidly connected to each other by rod 27 as shown. In the embodiment of FIG. 1 the inertia mass 16 comprises an auxiliary mass 46 between the pistons 24, 26. The auxiliary mass 46 actually accounts for most of the mass of the inertia mass 16. The pistons 24, 26 include, respectively, piston faces 28, 30 which are oppositely facing from each other. The piston 24 is disposed within the cylinder 10 and the piston 26 is disposed within the cylinder 12, the piston faces 28, 30 thereof defining in combination with said cylinders pressurizable chambers 32, 34 which are independent of each other. The expression "independent of each other" is herein defined to mean that there is no fluid communication between the chambers. This meaning is carried through into the claims.

A source 36 of pressurized, compressible fluid such as air is supplied to said chambers through their respective inlets 38, 40. The compressed air first passes through a pressure regulator 42 which maintains the supply pressures to both chambers constant and equal. The magnitude of the pressure may be set as desired by an adjusting means 44 associated with pressure regulator 42.

In operation, the chambers 32, 34 are pressurized with fluid from the source 36. Vibrations of the body 14 set up vibrations in the inertia mass 16. The pressurized fluid within the chambers 32, 34 acts as air springs. As the inertia mass 16 translates, for example, to the right the pressure and volume difference between the chambers 34 and 32 will cause a restoring force to push against the piston face 30 tending to move the inertia mass 16 to the left where the same thing will occur in the opposite direction. The relationship between the restoring force and displacement magnitude will control the natural period of vibration of the inertia mass 16. As discussed in the aforementioned Frahm patent, the vibrations of the body 14 will be most effectively absorbed when the natural period of vibration of the inertia mass 16 is the same as the period of vibration of the body 14. Assuming that the minimum volumes and minimum pressures of each chamber 32, 34 do not substantially differ from each other, then the restoring forces on the piston faces 28, 30 will be approximately symmetric or the same (but in the opposite direction) for an equivalent displacement to either side of a central position. By means of control valve 44 the pressure in the chambers 32, 34 can then be set at the value which reduces the vibrations of the body 14 to a minimum. This can be done simply by slowly increasing the pressure and watching the body 14 until the vibrations appear to be reduced to a minimum. it can also be done automatically by some type of vibration sensing device attached to the body 14 communicating with the valve 44 and causing adjustment of the pressure until such a device senses a minimum of vibration. This process, whether accomplished manually or automatically, is called tuning.

As heretofore stated, a requirement for effective operation of the vibration absorber is symmetric restoring forces on the surfaces 28, 30. This is most easily accomplished by preventing excessive disparity between the minimum volumes within the chambers 32, 34 during operation. One such device for accomplishing this is shown schematically in FIG. 1. Drift sensors 48, 50 are supplied with, for example, 40 psi air from a source 52 through needle valves 54, 56. Each of the drift sensors includes an orifice (not shown) through which this pressurized air may escape; however, when the auxiliary mass 46 is centrally located such that the volume within the chambers 32, 34 are equal, the close proximity of the auxiliary mass effectively blocks the orifices of both drift sensors such that the 40 psi pressure is seen by valves 60, 62 which are held closed thereby. The orifices of the drift sensors 48, 50 are positioned at a predetermined distance from the edges 64, 66 such that when the inertia mass 16 has drifted more than a desired amount, then one or the other of the orifices will bceome uncovered during one of the oscillations of the inertia mass. For example, suppose that the inertia mass 16 is drifting, over a period of time, toward the left. Eventually, during one of its compression strokes to the left, the edge 66 of the auxiliary mass 46 will move past the orifice of the sensor 50 thereby allowing a substantial increase in air flow out of sensor 50 and a reduction of the 40 psi pressure since airflow to the sensor 50 is choked by needle valve 56. The valve 62 which was being held closed by this pressure will suddenly open thereby passing, for example, 20 psi pressure from a source 68 into a valve 70 which will be opened thereby. When the valve 70 opens pressure is allowed to escape from the right hand chamber 34. Although it is true that the pressure regulator 42 will immediately begin to compensate for the loss of pressure, it will not be able to do so fast enough in view of valves 72, 74 which are sized relative to one another so that the pressure may escape from the chamber 34 faster than it can be returned from the air source 36. Thus, the pressure in the chamber 34 will temporarily drop below that of the pressure in the chamber 32 so that the inertia mass 16 will shift back to the right thereby closing the orifice in the drift sensor 50. As soon as that orifice is closed the valve 70 closes and the chamber 34 is brought back to its original pressure. Valves 76, 77 and 79, provide similar capability for the escape of pressure from the left hand chamber 32.

One further feature of the embodiment shown in FIG. 1 are check valves 78, 80. The check valves permit pressurized fluid to enter the chambers 32, 34 but prevent fluid from leaving said chambers through inlets 38, 40. Thus, in effect, the pressure regulator 42 maintains a minimum pressure in the chambers 32, 34. This is desirable, since during the compression stroke the pressure will increase beyond that set by control valve 44 but the pressure will never go below that set by the control valve 44. It is preferable that the chamber volumes 32, 34 be as small as possible since lower pressures will be required to do the same job. As is well known, the effective volume of the chamber 32, 34 will also include the volume of the air in the lines leading into the chambers. The check valves 78, 80 serve the additional purpose of cutting off, from the effective chamber volume, the volume of air in the supply lines connected to the chambers 32, 34. It is thus preferable that the check valves be positioned as close to the inlets 38, 40 as possible. It may even be desirable to build the check valves into the cylinder wall.

A system such as that described in FIG. 1 was tested in the laboratory. The total weight of the body 14 was estimated at about 3,150 lb; its effective mass, however, was equivalent to only 80 lb. It had an effective spring constant of 9,400 lb/in. The body 14 was forced to vibrate using a forcing function which was ±20 lb peak to peak. The frequency of the forcing function could be varied anywhere from 17.5 to 70 cycles per second. The resonant frequency of the body 14 was 33.85 cycles per second. Without any absorbing device attached thereto the response at resonance was 3.88 volts root means square (VRMS) which is directly proportional to the root means square of the acceleration. A vibration absorber as shown in FIG. 1 and having an inertia mass of 6.4 lb (i.e. 0.08 mass ratio with respect to the effective mass of the vibrating system) was attached to the body 14. This changed its resonant frequency to 34.1 cycles per second. It was found that maximum absorbing at the resonant frequency occurred when the pressure in the chambers 32, 34 was set at 270 psig. At that pressure the response of the system was only 0.602 VRMS, about an 85 percent reduction from the 3.88 VRMS of the undamped system. It is expected that refinements in the laboratory equipment may result in a vibration absorber which can achieve up to 90 percent or greater attenuation in vibrations.

In the foregoing laboratory tests the volume of trapped air in each of the chambers 32, 34 was one cubic inch and the cross-sectional area of each chamber was 1 square inch. During a typical cycle the inertia mass 16 traveled a maximum of 0.05 inch in each direction. The orifices of the drift sensors 48, 50 were positioned 0.25 inch inward from each edge 64, 66 respectively when the inertia mass 16 was in a central position. Thus, the mean minimum chamber volume of 0.95 cubic inches was never allowed to vary more than about ±0.20 cubic inch or 21 percent before the adjusting means compensated for the drift. It was found in these tests that as the inertia mass drifted so as to approach its maximum allowable shift of 0.20 inch, there was a noticeable, although not large, increase in vibration of the body 14; therefore, for best results it is preferable that the mean minimum chamber volume not vary by more than ±25%.

Figure 2:
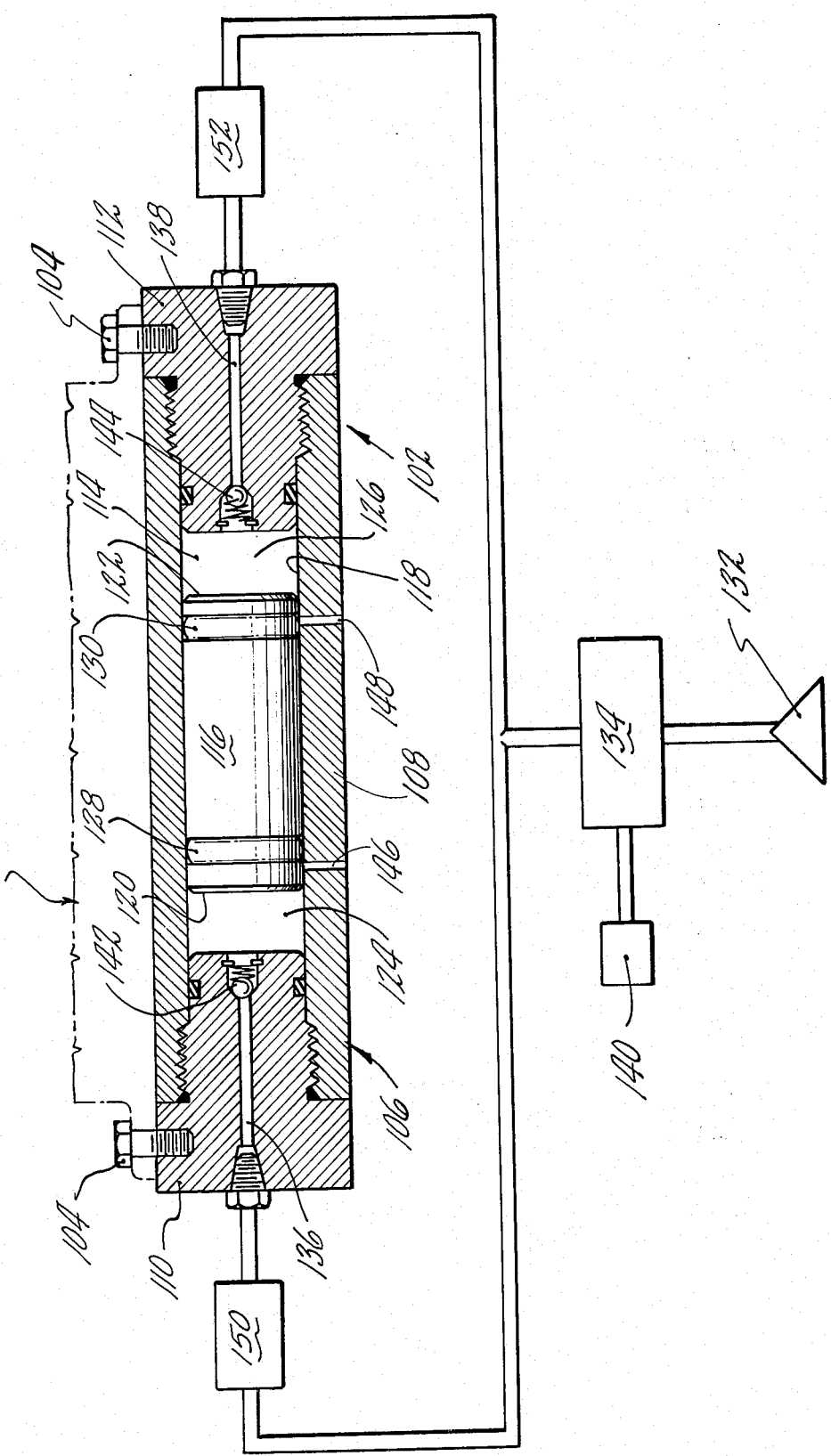
FIG. 2 is an illustrative cross-sectional view, partly schematic, of another embodiment of the present invention.

FIG. 2 shows an alternate embodiment of the subject invention. Briefly, the vibrating body is designated by the numeral 100. The vibration absorber is designated generally by the numeral 102. The absorber 102 is attached to the body 100 by any suitable means such as bolts 104. The absorber comprises a housing generally designated by the numeral 106. The housing 106 consists of an annular main body portion 108 having a threaded plug 110, 112 at each end thereof defining a cylindrical air space 114 therebetween. The vibration absorber 102 also includes a cylindrical inertia mass 116. The mass 116 is disposed within the air space 114 and is in sliding engagement with the cylindrical wall 118 of the housing 106. The mass 116 includes oppositely directed piston faces 120, 122, which define, in combination with the housing 106, pressurizable chambers 124, 126. Low friction annular seals 128, 130 disposed within the mass 116 sealingly engage the wall 118 thereby preventing fluid communication between the chambers 124, 126. The chambers are thus independent of one another.

Air under pressure from any suitable source 132 passes through a pressure regulator 134 and into the chambers 124, 126 by way of inlet passageways 136, 138 in the plugs 110, 112. Adjusting means 140 is associated with the pressure regulator 134 so that the pressure within the chambers 124 and 126 may be set at any desired value. Check valves 142, 144 are also provided to prevent pressurized fluid from leaving the chambers and to minimize the effective volume of the chambers.

In operation the device of FIG. 2 is very similar to that of the device shown in FIG. 1. The inertia mass 116 vibrates in response to vibrations of the body 100. The pressure within the chambers 124, 126 is adjusted by adjusting means 140 until the vibrating body 100 is vibrating at a minimum amplitude. This will occur when the natural frequency of the mass 116 is equal to the frequency of vibration of body 100. As with the system shown in FIG. 1, the system of FIG. 2 also includes adjusting means to keep the mass 116 vibrating substantially about the center of the air space 114 so that the minimum volumes in the chambers 124, 126 are not allowed to differ from one another by more than a predetermined amount. In this embodiment the adjusting means is simply the exhaust ports 146, 148. When the inertia mass 116 is properly positioned these ports simply provide a means for any air leaking around the pistons 128, 126 to escape from the air space 114 so that the chambers 124, 126 are truly independent of one another. If, however, the mass 116 drifts, for example, too far to the right then some of the air in the chamber 124 will escape through the port 146. A restrictor 150 limits the volumetric flow rate of air entering the chamber 124 to a lower value than that exhausting through the port 146 resulting in a pressure drop in the chamber 124 thereby causing the mass 116 to shift back to the left. A restrictor 152 is also positioned in the air supply line to the chamber 126. It should be apparent to one with ordinary skill in the art that considerably more sophisticated devices may be employed to keep the mass 116 centered; the means shown in this example and in the example of the embodiment of FIG. 1 are merely two ways of achieving the desired results. These two techniques are merely shown by way of example, and the invention is not intended to be limited thereto.

Although the invention is shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A vibration absorber for attachment to a vibrating mass comprising:
   housing means;
   inertia mass means adapted to naturally reciprocate in response to vibrations of the vibrating mass, said inertia mass means comprising oppositely facing first and second piston faces disposed within said housing means along a common axis, said faces defining in combination with said housing means a first and a second pressurizable chamber each being independent of the other, said inertia mass means also including connecting means rigidly joining said piston faces;
   pressure regulating means associated with said chambers for maintaining substantially equal minimum pressures therewithin;
   control means associated with said pressure regulating means for setting the proper pressure in said chambers to cause said inertia mass means to naturally reciprocate with substantially the same period as the vibrations of the vibrating mass; and
   adjusting means associated with said inertia mass means causing adjustment in the position of said inertia mass means to maintain approximately symmetric restoring forces on said first and second piston faces during reciprocating motion of said inertia mass means.

2. The vibration absorber according to claim 1 wherein said chambers have equal volumes when said inertia mass means is in a first position, and said adjusting means includes means for adjusting the position of said inertia mass means so that it always reciprocates substantially about said first position, thereby maintaining approximately symmetric restoring forces on said piston faces during operation of the absorber.

3. The vibration absorber according to claim 1 wherein said inertia mass means is a cylinder and said piston faces are end faces of said cylinder.

4. The vibration absorber according to claim 3 wherein said housing means defines a cylindrical chamber and said first and second pressurizable chambers are portions of said cylindrical chamber and said inertia mass means is disposed within said cylindrical chamber.

5. The vibration absorber according to claim 1 wherein said adjusting means includes means for temporarily creating a differential in pressure between said chambers.

6. The vibration absorber according to claim 1 wherein said chambers have equal volumes when said inertia mass means is in a first position, and said adjusting means includes means for sensing during reciprocal motion of said inertia mass means when the position of said inertia mass means is more than a predetermined distance from said first position, said adjusting means also including means responsive to said sensing means for temporarily creating a differential in pressure between said chambers when said predetermined distance is reached so as to cause said inertia mass means to shift in position so that it is less than said predetermined distance from said first position.

7. The vibration absorber according to claim 6 wherein when said inertia mass means is reciprocating evenly about said first position the minimum volume in either chamber is the means minimum volume and wherein when said inertia mass means is at said predetermined distance from said first position the volume in said chambers is within 25 percent of said mean minimum volume.

* * * * *